United States Patent [19]

Wattenhofer

[11] Patent Number: 4,539,694
[45] Date of Patent: Sep. 3, 1985

[54] NON-LINEAR COUNTING CIRCUIT
[75] Inventor: Jean-Pierre Wattenhofer, Neuchatel, Switzerland
[73] Assignee: ASULAB S.A., Bienne, Switzerland
[21] Appl. No.: 535,187
[22] Filed: Sep. 23, 1983
[30] Foreign Application Priority Data Sep. 24, 1982 [FR] France ................. 82 16259

[51] Int. Cl.³ .................. H03K 1/300; H03K 5/156; H03K 3/78; H03K 21/08
[52] U.S. Cl. ........................ 377/42; 377/33; 377/44; 328/143; 328/152; 364/719
[58] Field of Search ............. 328/142, 143, 152, 154; 377/39, 33, 44, 42; 364/718, 719

[56] References Cited
U.S. PATENT DOCUMENTS

| | | | |
|---|---|---|---|
| 3,283,254 | 11/1966 | Haynie | 328/143 |
| 3,621,228 | 11/1971 | Paine | 364/718 |
| 3,727,037 | 4/1973 | Zorn | 364/719 |
| 3,831,015 | 8/1974 | Hoff | 364/718 |
| 4,115,863 | 9/1978 | Brown | 364/719 |
| 4,321,548 | 3/1982 | Jeenicke | 328/143 |
| 4,499,588 | 2/1985 | Deyer | 377/42 |

FOREIGN PATENT DOCUMENTS 2122188 1/1972 France .

Primary Examiner—John S. Heyman
Attorney, Agent, or Firm—Pollock, Vande Sande & Priddy

[57] ABSTRACT

The counting circuit described issues a numerical information which is a non-linear function of the number of pulses applied to its input.

The circuit comprises dividers which divide by integers $K_i$ the pulses applied to their inputs. A first selector connects the output of one of the dividers to the input of a counter in response to a first signal. The content of the counter is compared with numbers $k_i$ by comparators. The output of one of the comparators is connected to a control circuit by a second selector controlled by a second signal issued by the control circuit in response to a comparison signal.

3 Claims, 7 Drawing Figures

NON-LINEAR COUNTING CIRCUIT

BACKGROUND OF THE INVENTION

This invention relates to a non-linear counting circuit.

More particularly, the invention is concerned with a circuit which receives on its input a plurality (P) of pulses and which issues on its output a number (N), e.g. in binary form, where N=f(p), f being a continuous non-linear function.

Such a circuit can have many applications. For example, it can be introduced in a calculating unit to generate non-linear functions of an input variable. It can also be used in electronic circuits associated with measuring sensors which issue information in the form of a frequency. This circuit is then used, for example, to linearise the issued information when the sensor does not issue on its output a frequency which is actually a linear function of the value of the magnitude being measured by the sensor. It can also be used in certain systems for temperature compensating the frequency of a time base consisting mainly of a quartz resonator, the temperature information used in such systems to achieve compensation being supplied in the form of a signal having a frequency which is roughly a linear function of temperature. As is known, the frequency issued by a quartz resonator is usually a substantially quadratic function of temperature. Frequency compensation therefore involves having to calculate the square of the frequency issued by the temperature sensor.

One possible way of solving this kind of problem would be to resort to a microprocessor programmed to perform the non-linear transformation. However, such a solution is too complex and thus too costly if the function to be generated is fairly simple and if it is always the same, or comes in a very limited number of forms.

SUMMARY OF THE INVENTION

A main object of the invention is to provide a counting circuit by means of which accurate non-linear functions may be generated and which is of relatively simple structure.

The non-linear counting circuit according to the invention comprises: n dividers each receiving on their input the pulses to be counted, each divider dividing by integers $K_1, K_2, \ldots, K_n$ respectively the number of pulses applied to its input and issuing on its output a counting signal each time it has counted $K_1, K_2, \ldots, K_n$ pulses respectively; a counter whose state at each instant is equal to the number that is representative of the value of said non-linear function for the number of pulses so far applied to the input of the counting circuit; first controllable selection means for connecting the output of one of the dividers to the input of the counter in response to a first selection signal; n−1 decoding means for comparing the state of the counter with one of n−1 integers $k_1, k_2, \ldots, k_{n-1}$ and for emitting a decoding signal whenever the state of the counter is equal to one of said integers; control means responsive to the decoding signal for generating, on receiving each decoding signal, said first selection signal, applied to the first selection means, and a second selection signal; and second controllable selection means responsive to said second selection signal for connecting the output of one of the decoders to the input of the control means, the selection of the particular divider and decoder being each time determined in accordance with said non-linear function to be generated.

BRIEF DESCRIPTION OF THE DRAWINGS

In the accompanying drawings, given by way of example:

FIG. 3 shows in a more detailed manner one form of counting circuit for generating a function of the kind shown in FIG. 2a.

DETAILED DESCRIPTION

Figure 1:
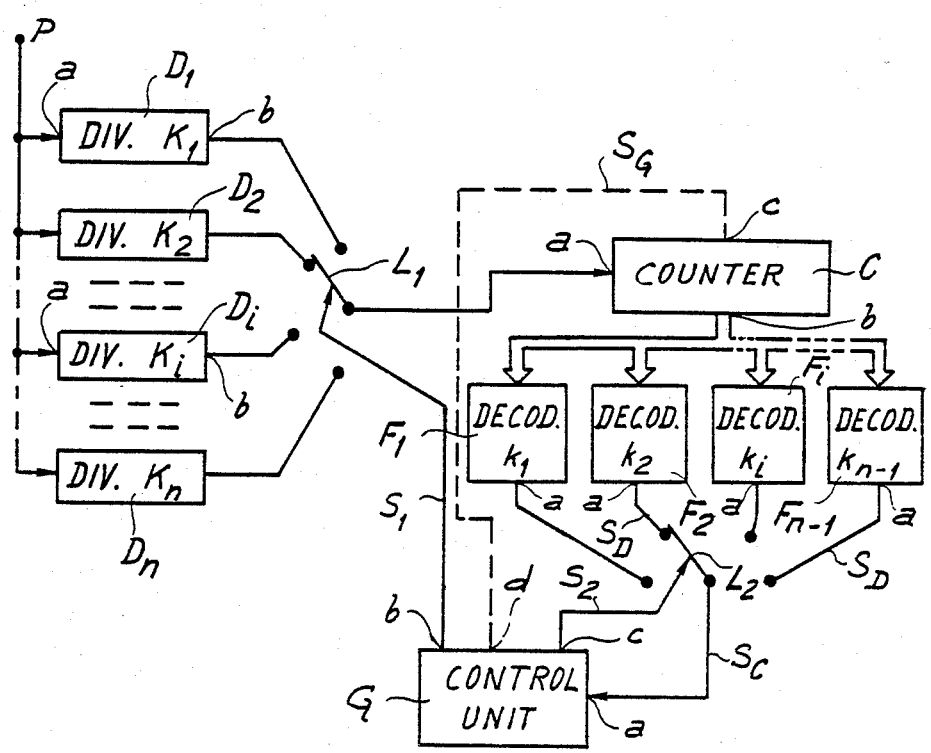
FIG. 1 is a general diagram of a non-linear counting circuit according to the invention.

The counting circuit of FIG. 1 comprises n dividers $D_1, D_2, \ldots, D_i, \ldots, D_n$, each having a clock input a and an output b. Each divider $D_i$ receives on its input a the pulses p to be counted. Each divider $D_i$ divides the number of pulses it receives on its input by integers $K_1, K_2, \ldots, K_i, \ldots, K_n$ respectively. In other words, each divider $D_i$ issues a pulse on its output b whenever $K_i$ pulses have been applied to its input a. The counting circuit also comprises a counter C having a clock input a and state outputs collectively referenced b. A first controllable selector $L_1$ connects, in response to a control signal, the output b of one of the dividers $D_i$ to clock input a of counter C. For the sake of simplicity, selector $L_1$ is here shown as a movable contact element; this representation, as will be realized later, is purely symbolical. The state outputs b of counter C are connected to decoders $F_1, F_2, \ldots, F_i, \ldots, F_{n-1}$ which compare the state of counter C with integers $k_1, k_2, \ldots, k_i, \ldots, k_{n-1}$ respectively. Decoders $F_i$ issue a decoding signal $S_D$ on their outputs a when the content of counter C is equal to integer $k_i$. The non-linear counting circuit further comprises a control unit G. Control unit G has an input a which is connected to the outputs a of decoders $F_i$ via a second selector $L_2$ which issues a control signal $S_C$ whenever a decoding signal $S_D$ appears on the selected output. Control unit G also has a first output b through which it can emit a first selection signal $S_1$ in response to the application of a decoding signal $S_D$ on its input a. The purpose of this signal $S_1$ is to control the position of selector $L_1$, i.e. to determine which divider $D_i$ is to be connected to counter C. Control unit G further has a second output c through which it can emit a second selection signal $S_2$ in response to the application of a control signal $S_C$. The purpose of this signal $S_2$ is to control selector $L_2$, i.e. to determine which decoder $F_i$ is to be connected to the input a of control unit G.

The circuit shown in FIG. 1 operates as follows. Initially, and before pulses p are applied, the dividers $D_i$ and counter C are reset. Selectors $L_1$ and $L_2$ are initially set to correspond to the start of the required non-linear function. Pulses p are then applied to the inputs of dividers $D_i$. In the following description, it is assumed that divider $D_2$ is connected to the input a of counter C and that decoder $F_2$ is connected to the input a of control unit G. Divider $D_2$ emits a signal every time $K_2$ pulses are applied to its input. Counter C is incremented by the pulses issued by divider $D_2$. The content of counter C is permanently compared with the integers $k_i$. When the content of counter C reaches value $k_2$, a control pulse $S_C$ is applied to the input a of control unit G. Control unit G then emits a new selection signal $S_1$ to connect another divider $D_i$ to the input a of counter C, and a new selection signal $S_2$ to connect another decoder $F_i$ to the input a of control unit G. The signals issued by the divider to the input of counter C increment the latter until its content reaches the value $k_i$ of the decoder that is connected to the input of control unit G. Similar cycles are repeated until all of the pulses p have been applied to the inputs of dividers $D_i$. The content N of counter C is then equal to the numerical value of the non-linear function (f) generated by the circuit for a value of the variable p equal to the total number of pulses applied to the input of the circuit.

Figure 2A:
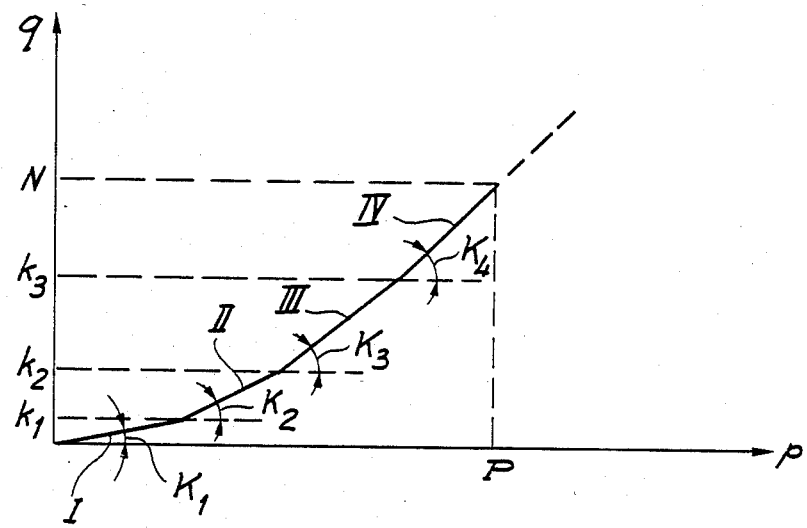
FIGS. 2a and 2b show two kinds of continuous function that can be generated with a counting circuit according to the invention.

FIG. 2a illustrates the operation of the circuit when the graph of the non-linearity to be generated is a continuous curve of increasing derivative.

The graph of non-linearity generated by the circuit is represented in FIG. 2a by a succession of straight line segments I, II, III and IV. The graph represents the content q of the counter C as a function of the number of pulses p successively applied to the input of the counting circuit. The first segment I is described in the first phase explained earlier. In this particular example, the first selection signal $S_1$ initially causes selector $L_1$ to connect the output b of divider $D_1$ to the input a of counter C, and the signal $S_2$ causes selector $L_2$ to connect comparator $F_1$ to the input a of control unit G. During this first cycle, or phase, segment I is traced until decoder $F_1$ issues a decoding signal $S_D$. At that instant, a new selection signal $S_1$ causes the output of divider $D_2$ to be connected to the input of counter C and a new signal $S_2$ causes the output of decoder $F_2$ to be connected to the input of control unit G. In this second phase, segment II is traced until decoder $F_2$ issues a new decoding signal $S_D$. In the third phase, corresponding to segment III, divider $D_3$ (not shown) is connected to counter C and decoder $F_3$ (not shown) is connected to control unit G. In the last phase, corresponding to segment IV, divider $D_4$ is connected to counter C and decoder $F_4$ is connected to control unit G. When all the pulses p (i.e. a total of P pulses) have been applied to the input of the dividers, counter C is no further incremented and its final content N is equal to the numerical value of the non-linear function (f) for the value P of the variable p.

Thus, each segment is determined by a pair of numbers, respectively $K_i$ which is given by dividers $D_i$ and which determines the slope of the segment, and $k_i$ which is given by a decoder $F_i$ and which determines directly the "length" of the segment by successive subtractions ($k_i - k_{i-1}$). These pairs of values $K_i$ and $k_i$ are supplied successively to selectors $L_1$ and $L_2$ on the basis of the information contained in control unit G, in the form of selection signals $S_1$ and $S_2$. In this example, consecutive dividers are connected to the input of the counter, and consecutive decoders are connected to the input of the control unit. The information contained in control unit G is therefore extremely simple, since it consists of a series of successive steps to control the positions of the selectors. Thus in a particular form of embodiment for generating a function of the type shown in FIG. 2a, control unit G and selectors $L_1$ and $L_2$ can have a very simple structure.

Figure 2B:
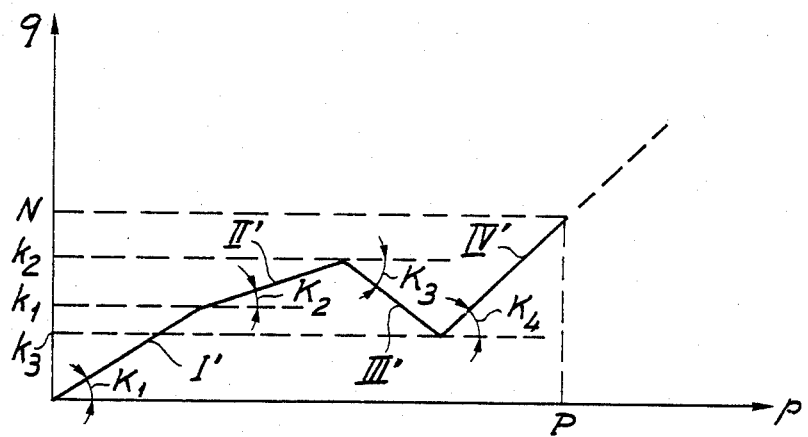

FIG. 2b illustrates a mode of controlling the circuit such as to generate a non-linearity whose representative curve has a derivative of changing sign. For example, the graph of FIG. 2b has a first segment I' and a second segment II' both of positive slope, then a segment III' of negative slope, and finally a fourth segment IV' again of positive slope.

To generate such a function, the counting circuit has a counter C that can be set in up and down counting modes. The counter has an additional control input c for receiving a sign signal $S_G$ from an output d of control unit G. When no signal $S_G$ is received, counter C is incremented by the pulses applied to its clock input a. But when a sign signal $S_G$ is applied to the input c of counter C, the latter is decremented by the pulses applied to its clock input a. Thus, when a signal $S_G$ is applied to counter C, a segment of negative slope is generated. Where the function contains a segment of negative slope, the successive decoding numbers $k_1$, $k_2$, $k_3$ are not of successively increasing value. In this mode of operation, control unit G activates divider $D_1$ and decoder $F_1$, then divider $D_2$ and decoder $F_2$, to generate successively the segments I' and II'. At this point, control unit G issues on its output d a sign signal $S_G$, thus setting counter C in down position. Moreover, signals $S_1$ and $S_2$ activate the divider $D_3$ and the decoder $F_3$. The pulses issued by divider $D_3$ decrement counter C until its content reaches the value $k_3$ which is smaller than $k_2$. Control unit G then ceases to issue signal $S_G$, and counter C again counts in the up mode the pulses applied to its clock input a. Simultaneously, control unit G issues a signal $S_1$ to activate divider $D_4$. No decoder $F_i$ need be activated to stop the count since the system stops as soon as all the pulses p have been applied to the inputs of the dividers. However, as a safety measure, one decoder may be activated, for example $F_4$, whose integer $k_4$ is equal to the value of the maximum content of counter C. Thus, if accidentally the number of pulses P is greater than the capacity of counter C, the circuit will cease to operate.

If one of the segments to be generated has a slope equal to 1, a divider of value 1 should not be used; instead one of the input terminals of selector $L_1$ should be made to receive the pulses p directly.

Figure 3:
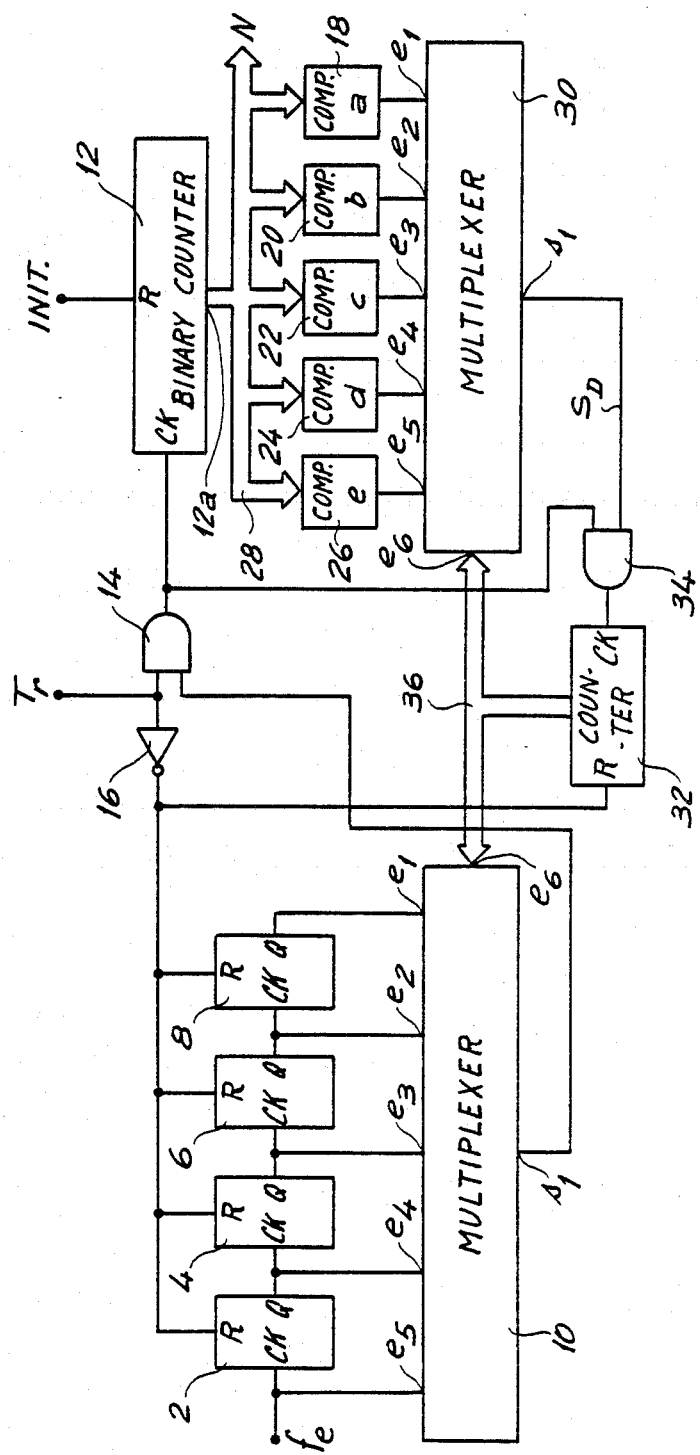

FIG. 3 shows in greater detail a form of embodiment of the counting circuit for when the non-linearity is as shown in FIG. 2a and when the integers $K_1$, $K_2$, ..., $K_5$, i.e. the reciprocals of the slopes, are worth respectively 16, 8, 4, 2 and 1. In other words, going from one slope to the next involves multiplying the previous slope by two. The values corresponding to integers $k_1$, ..., $k_4$ will be designated a, b, c and d. Further, in the form of embodiment shown in FIG. 3, the counting circuit generates a non-linear function of the frequency of a periodic signal of constant frequency. To that effect, a frequency signal $f_e$ is applied to the input of the circuit for a time $T_r$. This amounts to applying a number of pulses ($f_e \times T_r$) as described with reference to FIG. 1.

The circuit comprises four binary division stages 2, 4, 6 and 8. Each stage has a clock input CK, a direct output Q and a reset input R. The output Q of one division stage is connected to the input CK of the following stage. The input CK of the first binary counter 2 receives the frequency signal $f_e$. The outputs Q of the binary counting stages are connected to the inputs $e_1$, $e_2$, $e_3$ and $e_4$ of a multiplexer 10. Signal $f_e$ is also applied directly to the input $e_5$ of multiplexer 10. Multiplexer 10 also has a control input $e_6$ and an output $s_1$. The counting circuit further comprises a binary counter 12 whose clock input CK is connected to the output $s_1$ of multiplexer 10 via an AND gate 14. Gate 14 receives on its second input a reference period signal $T_r$. In other words, gate 14 is open for a time $T_r$. Signal $T_r$ is also applied to the reset inputs R of binary division stages 2 to 8 via an inverter 16.

The counting circuit further comprises comparators 18, 20, 22, 24 and 26 that compare a binary number applied to their inputs with numbers a, b, c, d and e respectively. The inputs of the comparators are connected to the state output 12a of counter 12 by a bus 28. Each of the comparators 18 to 26 thus permanently receives on its input the state, i.e. the content, of counter 12. The outputs of comparators 18 to 26 are connected to the inputs $e_1$ to $e_5$ of a second multiplexer 30. This multiplexer also has a control input $e_6$ and an output $s_1$. The output $s_1$ of multiplexer 30 is connected to the clock input CK of a counter 32 via an AND gate 34. The second input of gate 34 receives the signal issued by gate 14. The state of counter 32 is applied permanently to the control inputs $e_6$ of multiplexers 10 and 30 by a bus 36. The output of inverter 16 is connected to the reset input R of counter 32.

In FIGS. 1 and 3, the outputs Q of binary division stages 2 to 8 correspond to the outputs b of dividers $D_1$; multiplexer 10 corresponds to selector $L_1$; counter 12 corresponds to counter C; comparators 18 to 26 correspond to decoders $F_i$; multiplexer 30 corresponds to selector $L_2$; and counter 32 corresponds to control unit G.

The FIG. 3 circuit operates as follows. Before counting starts, i.e. when the value of $T_r$ is zero, gate 14 is closed and a signal of logic level 1 is applied to the reset inputs R of binary division stages 2 to 8, and to the reset input R of counter 32. But beforehand, an initiating signal INIT is applied to the reset input R of counter 12 whose content is therefore reset. Counter 32 applies to the control inputs $e_6$ of multiplexers 10 and 30 the control value zero, thereby causing input $e_1$ to be connected to output $s_1$ in both multiplexers 10 and 30. At the start of the counting, i.e. when signal $T_r$ switches to logic level 1, gate 14 opens and the reset signal ceases to be applied to division stages 2 to 8 and to counter 32. The pulses of frequency signal $f_e$ are applied to the successive binary division stages. Each time sixteen pulses have been applied, counter 8 issues a pulse which increments counter 12 by one unit. When the state of counter 12 reaches value a, a pulse appears on the output $s_1$ of multiplexer 30. This pulse is applied to the input CK of counter 32 via synchronization AND gate 34. Logic value 1 is therefore applied to the control inputs $e_6$ of multiplexers 10 and 30. This causes the input $e_2$ of the multiplexers to be connected to their output $s_1$. Each time eight pulses of the frequency signal $f_e$ have been applied to division stages 2 to 8 a pulse is applied to the input of counter 12. The cycle is repeated for the comparison values b, c and d. From the decoding of the value d onwards, counter 12 is incremented directly by the frequency signal $f_e$. During this phase, at the latest, the state of the reference period signal $T_r$ returns to zero, thus closing gate 14, and counter 12 is no longer incremented. Simultaneously division stages 2 to 8 and counter 32 are reset. The state of counter 12 is then equal to the numerical value of the non-linear function of frequency $f_e$. If the reference period $T_r$ should accidentally be too long, counter 12 is liable to have a state equal to its maximum capacity before signal $T_r$ drops back to logic level 0. In this case, comparator 26 decodes this state of the counter and causes the circuit to cease operating.

Furthermore, a comparison of the FIG. 3 circuit with that of FIG. 1 shows that selection signals $S_1$ and $S_2$, which correspond to the numerical values applied successively to the inputs $e_6$ of the multiplexers, both have the same value. Also, the output $s_1$ of multiplexer 30 issues signal $S_D$ of FIG. 1.

Figure 4A:
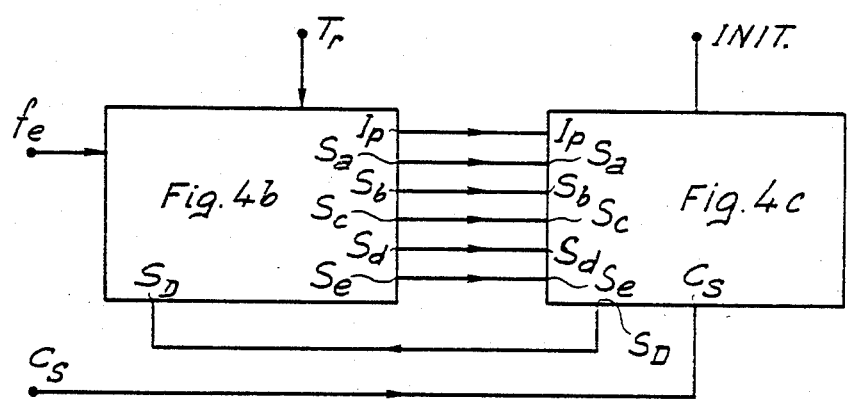
FIGS. 4a to 4c show in greater detail a particular embodiment of the FIG. 3 circuit for generating a continuously increasing function.
Figure 4B:
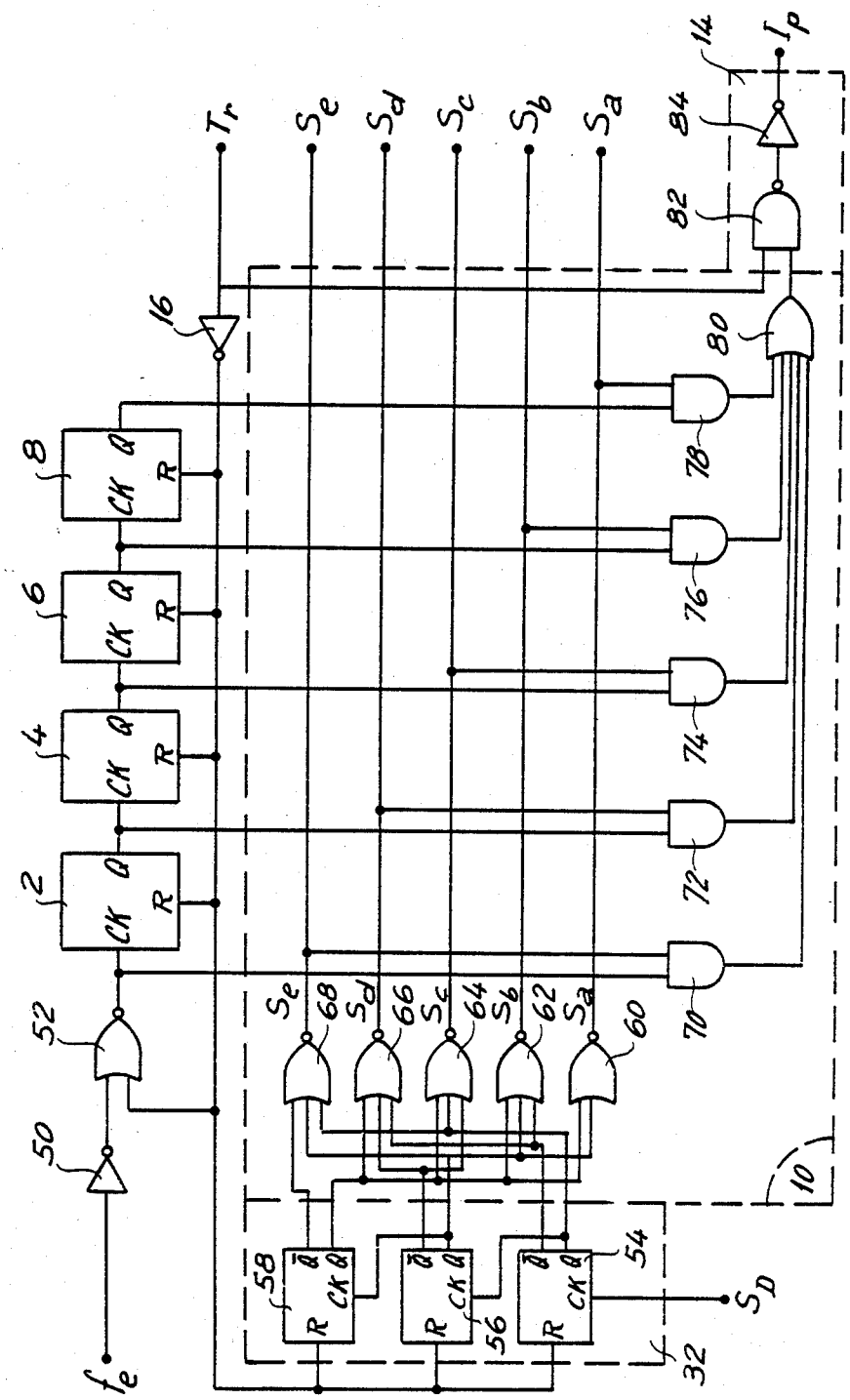
Figure 4C:
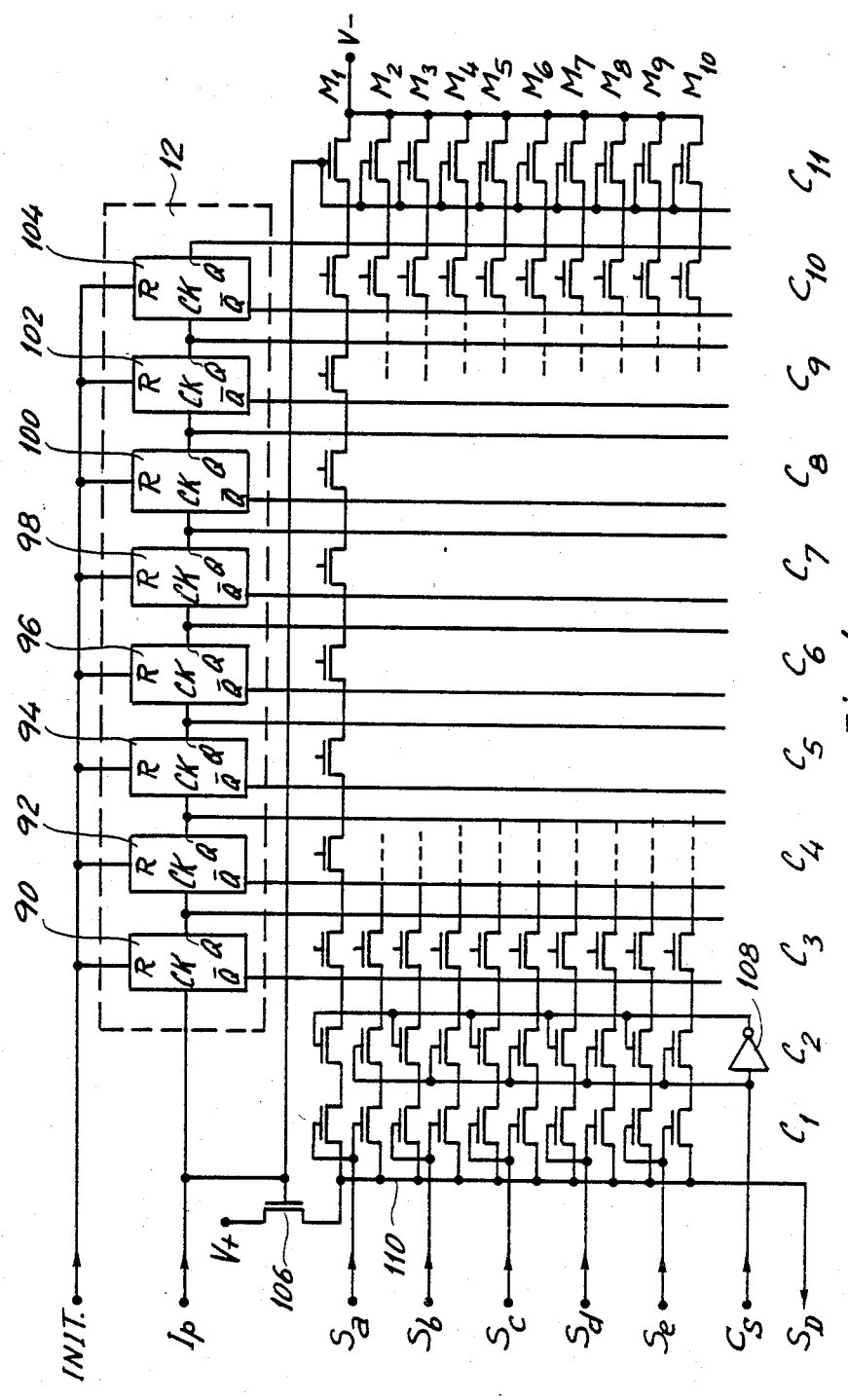

FIGS. 4a to 4c show in greater detail one form of embodiment of the counting circuit in FIG. 3. Regarding operation, the only difference is that an additional control signal $C_S$ is provided to enable the content of counter 12 to be compared with two series of numbers, i.e. with numbers a to e as in FIG. 3 and also with numbers a' to e' depending on the logic value of control signal $C_S$.

The circuit is shown split into FIG. 4b and FIG. 4c, with FIG. 4a showing how FIGS. 4b and 4c are to be assembled.

FIG. 4b shows that frequency signal $f_e$ is applied to the clock input of binary division stage 2 via an inverter 50 and a NOR gate 52. The reset inputs R of division stages 2 to 8 receive signal $T_r$ via inverter 16. The inverted $T_r$ signal is also applied to the second input of NOR gate 52. Gate 52 is thus open only when signal $T_r$ is at logic level 1. In FIG. 4b, the counter 32 of FIG. 3 is made up of binary division stages 54, 56 and 58. The actual number of these division stages depends on the number of straight line segments forming the nonlinear function to be generated. The clock input CK of division stage 54 receives the signal $S_D$. The output Q of each division stage is connected to the clock input of the following stage. Further, the inverted $T_r$ signal is applied to the reset inputs R of division stages 54 to 58. The outputs Q and $\bar{Q}$ are connected to the inputs of three-input NOR gates 60, 62, 64, 66 and 68. The connections are such that when the content of counter 32 is zero, i.e. when the state of all the division stages 54 to 58 is zero, a signal of logic level 1 appears on the output of gate 60, whereas the other gates 62 to 68 issue a signal of logic level 0. Similarly, when the content of counter 32 is equal to 1, i.e. when the content of division stage 54 is equal to 1 and that of division stages 56 and 58 is equal to 0, gate 62 issues a signal of logic level 1 whereas gates 60, 64, 66 and 68 issue a signal of logic level 0. More generally, gates 60 to 68 deliver respectively a signal of logic level 1 whenever the content of counter 32 is respectively 0, 1, 2, 3 and 4.

The counting circuit of FIGS. 4a and 4b also comprises five two-input AND gates 70, 72, 74, 76 and 78. One input of gate 70 is connected to the output of gate 52, the other to the output of gate 68. The outputs of division stage 2 and of gate 66 are connected to the inputs of gate 72, and so on. The inputs of gate 78 are connected respectively to the output of division stage 8 and to the output of gate 60. The outputs of AND gates 70 to 78 are connected to the inputs of an OR gate 80. The output of gate 80 is connected to one input of a NAND gate 82 which receives on its other input signal $T_r$. The output of gate 82 is connected to the input of an inverter 84 that issues on its output a signal $I_p$. Gates 82 and 84 together correspond to AND gate 14 in FIG. 3.

As the incrementation of counter 32 advances, gates 78 to 70 are successively opened, thereby causing the outputs of division stages 8, 6, 4 and 2 and the output of gate 52 to be directly and successively connected to the input of gate 82. Gates 60 to 68 and 70 to 78 thus are the equivalent of multiplexer 10 in FIG. 3. Furthermore, the signals $S_a$ to $S_e$ issued by gates 60 to 68 together are the equivalent of selection signals $S_1$ and $S_2$ in FIG. 1.

As explained earlier, signals $S_1$ and $S_2$ in the form of embodiment of FIG. 1 are identical.

FIG. 4c shows in greater detail the counter 12 of FIG. 3, made up of eight binary division stages 90, 92, 94, 96, 98, 100, 102 and 104. Each division stage has a clock input CK, outputs Q and $\overline{Q}$, and a reset input R. The input CK of division stage 90 receives signal $I_p$. Reset inputs R receive the signal INIT as explained earlier. In this form of embodiment, decoders 18 to 26 and the multiplexer 30 of FIG. 3 are embodied in a common structure. This structure consists of a switchboard whose switches are, for example, made up of MOS transistors. This board has ten rows M1 to M10 and eleven columns C1 to C11. The transistors of column C11 control the supply of the remaining switchboard transistors with potentials lying between V− and V+. This supply control is effected via a transistor 106 whose gate receives signal $I_p$, as also the gates of the transistors of column C11. The transistors of columns C3 to C10 are used for decoding the content of division stages 90 to 104. To this end, the gates of the transistors of one column are connected to the output Q or to the output $\overline{Q}$ of division stage 90 to 104 corresponding to that column. These particular connections are symbolized here by lines stemming from the outputs Q and $\overline{Q}$ of stages 90 to 104 and framing the transistors of the corresponding column. Further, if the comparision with numbers a to e is carried out when signal $C_S$ is of logic level 1 and if the comparison with numbers a' to e' is carried out when signal $C_S$ is of logic level 0, the rows of transistors M2, M4, M6, M8 and M10 are used for decoding numbers a to e and the rows M1, M3, M5, M7 and M9 for decoding numbers a' to e'. Considering the transistors of column C1, the gates of the transistors in rows M1 and M2 receive signal $S_a$, the gates of the transistors of rows M3 and M4 receive signal $S_b$, etc., and the gates of transistors in rows M9 and M10 receive signal $S_e$.

The transistors of column C2 enable a distinction to be made between the decoding of numbers a to e and the decoding of numbers a' to e'. To this end, signal $C_S$ is applied directly to the gates of the transistors in column C2 placed on even-numbered rows. Signal $C_S$, inverted by inverter 108, is applied to the gates of the transistors in column C2 placed on odd-numbered rows.

The operation of this decoding unit is very simple. During the first counting phase signal $S_a$ is of logic level 1. If control signal $C_S$ is also of logic level 1, only row M2 is open. A signal $S_D$ will thus appear on row 110 when the content of division stages 90 to 104 is equal to number a, i.e. when a signal of logic level 1 is applied to the gates of all the transistors in row M2 of columns C3 to C10. The same occurs successively in the other even-numbered rows when selection signals $S_b, \ldots, S_e$ are applied. But if control signal $C_S$ is of logic level 0, it is the odd-numbered rows that are successively opened.

It ensues from the previous description that the counting circuit according to the invention has a relatively simple structure since it consists of logic gates and binary division stages. Further, it may be adapted to many non-linear functions, provided that these functions can be represented by a limited number of segments.

What is claimed is:

1. A non-linear counting circuit for a plurality of pulses, comprising:

n dividers adapted each to receive said pulses on their input, to divide them by integers $K_1, K_2, \ldots, K_n$ and to issue on their output a counting signal whenever $K_1, K_2, \ldots, K_n$ pulses have been counted;

a counter whose state at each instant is equal to the value of the non-linear counting function associated with the number of pulses counted;

first controllable selection means for connecting the output of one of said dividers to the input of said counter in response to a first selection signal;

n−1 decoding means for comparing the state of said counter with n−1 predetermined integers $k_1, k_2, \ldots, k_{n-1}$ and for each emitting a decoding signal whenever the state of said counter is equal to one of said n−1 integers;

a control unit for issuing said first selection signal and a second selection signal in response to the application of a decoding signal; and second controllable selection means for connecting the output of one of said decoding means to the input of said control unit in response to said second selection signal.

2. A counting circuit as in claim 1, wherein said control unit comprises a counter having a clock input for receiving said decoding signals and whose state is arranged to provide a common value to said first and second selection signals, wherein said first selection means comprises a first multiplexer having n inputs connected to the outputs of said n dividers, having a control input for receiving said first selection signal and having an output connected to the input of said counter, and wherein said second selection means comprises a second multiplexer having n−1 inputs connected to the outputs of the n−1 decoding means, having a control input for receiving said second selection signal and having an output arranged to issue said decoding signals.

3. A counting circuit as in claim 1, wherein said counter is adapted to be set in up and down counting modes in response to the state of a control signal issued by said control unit in synchronism with said selection signals.

* * * * *